United States Patent
Ragan et al.

(10) Patent No.: US 10,908,084 B2
(45) Date of Patent: Feb. 2, 2021

(54) DEVICES AND METHODS FOR DIRECT-SAMPLING ANALOG TIME-RESOLVED DETECTION

(76) Inventors: Timothy M. Ragan, Somerville, MA (US); Jason D. Sutin, Somerville, MA (US)

(*) Notice: Subject to any disclaimer, the term of this patent is extended or adjusted under 35 U.S.C. 154(b) by 0 days.

(21) Appl. No.: 13/124,297

(22) PCT Filed: Oct. 14, 2009

(86) PCT No.: PCT/US2009/060731
§ 371 (c)(1),
(2), (4) Date: Jul. 11, 2011

(87) PCT Pub. No.: WO2010/045400
PCT Pub. Date: Apr. 22, 2010

(65) Prior Publication Data
US 2011/0320174 A1 Dec. 29, 2011

Related U.S. Application Data

(60) Provisional application No. 61/105,402, filed on Oct. 14, 2008.

(51) Int. Cl.
G01N 21/00 (2006.01)
G01N 21/64 (2006.01)
G01N 21/65 (2006.01)

(52) U.S. Cl.
CPC ..... *G01N 21/6408* (2013.01); *G01N 21/6428* (2013.01); *G01N 21/6458* (2013.01); *G01N 2021/653* (2013.01)

(58) Field of Classification Search
CPC ....... G01N 21/6408; G01N 2021/1765; G01N 21/6456; A61B 5/0059; G02C 21/1765
See application file for complete search history.

(56) References Cited

U.S. PATENT DOCUMENTS 4,053,232 A * 10/1977 Dill et al. ............... 356/369
5,072,382 A   12/1991 Kamentsky
(Continued)

FOREIGN PATENT DOCUMENTS

EP   760475 A2 * 3/1997
EP   1291627 B1   7/2006
(Continued)

OTHER PUBLICATIONS

Chan et al., In vivo spectroscopic ellipsometry measurements on human skin, Journal of Biomedical Optics 12(1), 014023 (Jan./Feb. 2007).*

(Continued)

*Primary Examiner* — Mohamed Charioui
*Assistant Examiner* — Christine Y Liao

(57) ABSTRACT

Devices and methods for sampling an analog signal to perform data analysis are disclosed. The sampling devices and corresponding methods include a detector module that measures a response generated from a sample, an analog to digital converter that samples the analog signal, received from the detector module, and converting it into a digital signal, a sampling rate of the converter being faster than the response of the sample; and a logic circuit coupled to the converter that processes the digital signal in a frequency domain to generate a reduced digital data signal, the logic circuit processing the digital signal acquired from the converter to generate a continuous data transfer to a processing system.

35 Claims, 9 Drawing Sheets

(56) References Cited

U.S. PATENT DOCUMENTS

| | | | | |
|---|---|---|---|---|
| 5,131,742 | A * | 7/1992 | Schaff | G01J 3/447 |
| | | | | 356/73 |
| 5,151,869 | A * | 9/1992 | Alcala | G01N 21/6408 |
| | | | | 250/458.1 |
| 5,251,008 | A * | 10/1993 | Masutani | G01J 3/453 |
| | | | | 250/339.08 |
| 5,453,834 | A | 9/1995 | Evenstad | |
| 5,737,077 | A | 4/1998 | Lee et al. | |
| 5,909,278 | A | 6/1999 | Deka et al. | |
| 6,856,703 | B1 * | 2/2005 | Gobert | G06T 5/20 |
| | | | | 382/260 |
| 7,157,681 | B1 * | 1/2007 | Tetzlaff | 250/207 |
| 7,372,985 | B2 | 5/2008 | So et al. | |
| 7,724,937 | B2 | 5/2010 | So et al. | |
| 8,384,907 | B2 | 2/2013 | Tearney et al. | |
| 8,771,978 | B2 | 7/2014 | Ragan | |
| 2003/0151735 | A1 * | 8/2003 | Blumenfeld | G01N 21/6428 |
| | | | | 356/73 |
| 2004/0126275 | A1 * | 7/2004 | Doering | G01N 21/645 |
| | | | | 422/82.08 |
| 2005/0159662 | A1 * | 7/2005 | Imanishi et al. | 600/473 |
| 2007/0048790 | A1 * | 3/2007 | Sheetz et al. | 435/7.1 |
| 2007/0057211 | A1 | 3/2007 | Bahlman et al. | |
| 2007/0229801 | A1 * | 10/2007 | Tearney et al. | 356/73 |
| 2007/0260145 | A1 * | 11/2007 | Heanue | A61B 5/0059 |
| | | | | 600/473 |
| 2008/0192231 | A1 | 8/2008 | Jureller et al. | |
| 2008/0213915 | A1 | 9/2008 | Durack et al. | |
| 2009/0147264 | A1 * | 6/2009 | Lotze | 356/477 |
| 2010/0090127 | A1 * | 4/2010 | Yekta | G01N 21/6408 |
| | | | | 250/459.1 |
| 2010/0256016 | A1 * | 10/2010 | Blair | B82Y 15/00 |
| | | | | 506/13 |
| 2010/0277740 | A1 * | 11/2010 | Hulteen | G01N 21/274 |
| | | | | 356/445 |
| 2011/0309754 | A1 * | 12/2011 | Ashdown | H05B 33/0869 |
| | | | | 315/151 |
| 2011/0320174 | A1 | 12/2011 | Ragan et al. | |

FOREIGN PATENT DOCUMENTS

| | | |
|---|---|---|
| WO | 2007/131055 A2 | 11/2007 |
| WO | 2011/163484 A2 | 12/2011 |

OTHER PUBLICATIONS

Neumaier et al., Ellipsometric Microscopy, Europhys. Lett., 49(1), pp. 14-19 (2000).*

Allen, P.E., Nyquist Frequency Analog-Digital Converters, /http://users.ece.gatech.edu/~phasler/Courses/ECE6414/Unit6/ADCbasics.pdf, 2001, (last accessed Jan. 10, 2014).*

PCT Notification Concerning Transmittal of INternational Preliminary Report on Patentability; From Application No. PCT/US2009/060731; dated Apr. 28, 2011.

Colyer, Ryan A. et al., "A Novel Fluorescence Lifetime Imaging System That Optimizes Photon Efficiency", Microscopy Research and Technique, vol. 71, pp. 201-213 (2008).

Gratton, Enrico et al., "Fluorescence lifetime imaging for the two-photon microscope: time-domain and frequency-domain methods", Journal of Biomedical Optics, vol. 8, No. 3, pp. 381-390 (Jul. 2003).

Andresen et al., Time-multiplexed multifocal multiphoton microscope. Opt Lett. Jan. 15, 2001;26(2):75-7.

Leveque-Fort et al., Time-resolved multifocal multiphoton microscopy. Proceedings of SPIE—The International Society for Optical Engineering. Jun. 2003;5139:173-179.

Klein et al., A new generation of spectrometers for radio astronomy: Fast Fourier Transform Spectrometer. Proc of SPIE. Jun. 2006;6275;627511-1-627511-12.

* cited by examiner

DEVICES AND METHODS FOR DIRECT-SAMPLING ANALOG TIME-RESOLVED DETECTION

CROSS-REFERENCE TO RELATED APPLICATIONS

This application is the national phase application pursuant to 35 U.S.C. § 371 of International Application No. PCT/US2009/060731, filed Oct. 14, 2009, which claims the benefit of priority of Provisional Patent Application No. 61/105,402, filed Oct. 14, 2008. These applications are hereby incorporated herein by reference in their entireties.

BACKGROUND OF THE INVENTION

1. Field of the Invention

The subject invention relates to devices and methods for sampling an analog signal outputted from a detector in order to perform data analysis. More particularly, the present invention relates to devices and methods for a time-resolved approach that employs direct, high-speed sampling of the analog output of a detector, to capture harmonic content of the signal, without the need to modulate the detection system.

2. Description of the Related Art

Time-Resolved Measurements

Time-resolved measurements in biomedical science play a vital role with regards to spectroscopy and in vivo dynamical processes. For instance, lifetime spectroscopy and microscopy have provided critical insights into membrane dynamics, tissue physiology, protein folding, cell transport, protein dynamics, and microspectrometry. As another example, photon migration, which measures time of flight information from a light source to detector, offers promising therapeutic strategies for neonatal care, stroke diagnosis, tissue oxygenation, breast cancer identification, and sleep apnea diagnosis. Progress in these fields depends heavily on advances in instrumentation, which transform previously, specialized, expensive, difficult-to-use techniques into accessible tools for biologists and clinicians.

Time-resolved spectroscopy techniques can be loosely defined as techniques which allow the time course and kinetics of photo-physical process to be followed. Time-resolved measurements can provide a far richer, dynamical view about a process than simple steady-state measurements.

There are two dominant means for making time-resolved measurements: the time domain method and the frequency domain method. The time domain method, or more specifically, Time Correlated Single Photon Counting (TCSPC), has recently seen rapid growth in fluorescence spectroscopy and microscopy. This has spurred its use in laboratories, which previously would not have considered time-resolved methods. While TCSPC is becoming more popular with fluorescence studies, the Frequency Domain (FD) method is more prevalent in the photon migration field, due to its versatility, reduced noise bandwidth, and simplicity, and is making important inroads in clinical applications. TCSPC is generally regarded as more sensitive, but lacking the dynamic range of FD spectroscopy.

The analog frequency-domain approach offers some simplification in the analysis methods and in the laser sources used. However, the traditional frequency-domain electronics operating in the radio frequency range require gain modulated detectors, radio frequency amplifiers, and are not a simple addition to existing laser confocal microscopes. Whatever approach is utilized, current methods are relatively expensive, and require specialized electronic and modulated sources.

Time Correlated Single Photon Counting (TCSPC)

In TCSPC applications, a molecule sample undergoes some excitation process from a source. Once excited, a single molecule will spend a time τ in the excited state before decaying to the ground state. Mathematically, the mean fluorescence lifetime can be modeled as a simple exponential decay:

$$I(t)=I_o\exp(-t/\tau)$$

This expression provides only the mean decay time. For many biological phenomena, multiple components will contribute to the decay time and the decay curve will be a multi-exponential function or even nonexponential in some cases.

This lifetime is measured by exciting the sample with a pulsed source and recording the time between the excitation pulse and the arrival of the photon. As shown in FIG. 1, a histogram of arrival times can be constructed from successive trials. The fluorescence lifetime can then be recovered from a fit of the slope of log(I) versus t.

Frequency Domain Analysis

Frequency domain (FD) analysis is an alternative to TCSPC. Instead of recording the time between an excitation pulse and the detected photon, the harmonic content of the sample is measured by exciting the sample with either a sinusoidal signal or a pulsed source. In practice, the phase or modulation of the fluorescence signal relative to the excitation phase and modulation is measured as shown in FIG. 2. The resulting signal seen by the detector is at the same frequency, but phased delayed at an angle Φ and demodulated at a ratio m=(B/A)/(b/a).

The lifetime τ can be recovered using the standard equations:

$$\tan(\phi_\omega)=\omega\tau$$

$$m_\omega=(1+\omega^2\tau^2)^{-1/2}$$

where $\Phi_\omega$, and $m_\omega$, are the phase and modulation at the frequency ω. In order or the frequency domain to be of comparable resolution with the time domain, measurements at multiple frequencies must be taken. Thus, a complication of traditional FD measurements is that it is not possible to measure the output of the detector, e.g. a photomultiplier tube (PMT), directly. However, if the sensitivity of the PMT is varied, or modulated, at a frequency F+Δf, where Δf is small, a waveform at frequency 2F and beat frequency of Δf is produced. A low pass filter can then be used to capture only the Δf frequency. This technique is known as heterodyning. A similar technique, known as homodyning, is used for charge-coupled device (CCD) detection where the CCD is modulated at the same frequency F as the excitation. From this, the lifetime can also be measured.

Heterodyning and homodyning techniques have some disadvantages. As shown in FIG. 3, because the detector sensitivity is sinusoidally varied, the amount of signal collected over a full waveform is only 50% of the maximum. In other words, the duty cycle of the detector is lowered when the detector is modulated which lowers the sensitivity by 50% when time averaged over one period of the waveform. The situation is even worse if multiple frequencies are used to modulate the PMT as the duty cycle is reduced further. A second disadvantage of these conventional techniques arises from the modulation. While PMTs are nearly noiseless amplifiers, the radio frequency (RF) circuits and amplifier used for mixing introduce significant noise into FD measurements. This reduces the sensitivity even further, adding approximately an additional factor of two reduction in the signal-to-noise ratio (SNR). FIG. 4 is a schematic of a frequency domain fluoremeter. The arrow points to the RF amplifier which is used to modulate the PMT. It is a major source of noise and reduces the overall sensitivity of traditional FD measurements.

Comparison of Time Domain Versus Frequency Domain

The choice between the time domain and the frequency domain depends critically on the application. Most critically, the choice depends largely on a contribution of three factors: 1) integration time; 2) expected number of photons; and 3) motivation for data analysis. For example, in cuvette experiments, the primary motivation is accurate determination of the fluorescence lifetime and the number of lifetime components. There is little need to perform the measurement quickly and measurements can be taken over minutes and large number of photons collected. In contrast, in flow cytometry experiments, the cells are in the observation volume for a only a short period of time, so it is imperative to collect photons as quickly as possible. The motivation is to identify cell subpopulations, rather than make very accurate lifetime measurements. The case is similar, with Fluorescence Lifetime Imaging (FLI), where each pixel is illuminated for only a short period of time (usually measured in tens of microseconds) and the motivation is typically to generate contrast in the image rather than make highly accurate lifetime measurements on the picosecond range. In single molecule experiments, integration times are usually long and the total number of photons detected relatively small.

Overall, the particular application strongly affects the choice of the time versus frequency domain. For applications with very low photon count rates, TCSPC provides a better SNR. However, for applications with higher count rates, the frequency domain provides better SNR. This is in contrast to the intuitive notion that TCSPC, being a single photon counting technique, provides inherently better SNR. It has been found that for count rates that exceeded approximately $2*10^6$ photons/s, the frequency domain proved the better choice. This is due to the relatively slow electronics of the TCSPC method—the dead time of the instrument limited the rate at which photon could be processed. The frequency domain method, being an analog detection method, is able to handle high count rates and has an overall higher dynamic range.

FIG. 5 is a chart experimentally showing which application areas have shown to benefit from the frequency domain versus the time domain approach to time-resolved measurements. It indicates that the TCSPC is superior at low number of photons and is a method of choice for single molecule studies. However for the majority of other applications, the frequency domain is either equivalent or superior. In particular, the FLI data shown demonstrates that the TCSPC method is unable to handle bright regions in FLI image. This is of particular importance, since it is often the brighter portions of the image which are of biological interest, such as with protein aggregation or FRET analysis.

Frequency Domain Lifetime and Spectral Imaging Microscopy

Optical microscopy is an essential tool for the visualization of biological samples. Many imaging modalities have been devised to measure different properties of the specimen. Phase contrast, fluorescence, reflectance, coherent antistokes Raman scattering, second harmonic generation are a few of the wide range of techniques available to biologists. For medical applications, it has been shown that combining different imaging techniques provides deeper insight into the sample. Because of the large number of available intrinsic, extrinsic, and genetic probes, fluorescent microscopy is one of the most common bio-imaging tools. It has been used for tissue imaging, cellular imaging, and single molecule experiments. To track many concurrent processes in the same sample, discrimination between different fluorescent reporters is necessary. It is routinely done by splitting the emitted light into different detection channels with a spectral bandwidth of roughly 30-50 nm. However, most common fluorophores exhibit spectra with a long\red emission tail, and quantitative measurements of more than three dyes become difficult. This limitation can be avoided by recording of the whole emission spectrum of the specimen using spectral imaging. The contribution of a large number of fluorophores in the same specimen can then be recovered using linear unmixing techniques. Fluorescence lifetime imaging microscopy (FLIM) can also be used to discriminate between different species present in the sample. Since the lifetime of the dye is sensitive to the immediate environment of the dye, it is also commonly applied to the quantification of cation concentrations or of Förster resonance energy transfer (FRET).

The advantage of FLIM over intensity-based measurements is that the measured lifetime is independent of the concentration of the emitter. As in the cation measurement example, the variation of the concentration of a cation in the cellular and extracellular space can be tracked without being influenced by the repartition of the cation-sensitive dye between these two environments. Combining spectral imaging and FLIM would allow for a better discrimination between fluorophores in the same specimen. For instance, two dyes with very similar emission spectra are difficult to separate with a linear unmixing technique, but the lifetime measurement could provide a mean to distinguish between them. Moreover, this technique can be applied to measure the complete photophysics in a FRET system. The measurement of the change in the spectrum of a FRET pair can be coupled with the quantification of the acceleration of the decay of the donor and the lengthening of the fluorescence of the acceptor. Subsequently, the quantification of the FRET process can be improved.

Despite the useful information that these measurements could provide, a limited number of reports describe the implementation of combined lifetime and spectral imaging set-ups. The first implementation of such a detection scheme is based on a programmable array microscope using Hadamard transform process to encode the emission spectrum and the spatial position in a 2D image. This device is coupled with a frequency-modulated image intensifier to measure the lifetime in the frequency domain. Another set-up is based on a laser scanning microscope whose emission is coupled via a fiber to a spectrograph to split the emission as a function of emission wavelength. The signal is then fed to a streak camera to separate the emitted photons as function of their time of emission. Although these two set-ups provide a well resolved emission spectrum and good lifetime quantification, they require a large emitted photon flux because of the poor quantum efficiency of the detection.

Another set-up that has been characterized is based on two commercially available time-correlated photon-counting PCI cards. Each card can store the photon counting trace of up to eight channels. The detector for this set-up is a multi-anode PMT placed at the image plane of a spectrograph, which is coupled to the output of a two-photon microscope. Because of the digitization of the signal and a limited number of spectral channels, this set-up is most efficient at low light levels. However, the time correlation of each photon takes time and leads to a dead time after each photon detection. In this set-up, since all eight spectral channels are multiplexed to a single time correlation electronic circuit, there is further reduction in duty cycle. As a result, this is a severe limitation for the correct lifetime measurements at high count rates. Another report describes a detector based on a microchannel plate detector. The detector is combined with an electronic delay-line to record the spectral information of the detected photon, and a time to amplitude converter is implemented to measure the temporal decay of the photon. This set-up suffers from the same problem as the previous one. The time needed for the detection is long. Therefore, the repetition rate of the laser had to be lowered, and at high intensities, only a single photon per laser pulse will be analyzed. While those limitations are mainly technical and could be circumvented by using multiple TCSPC cards, a system with sixteen independent time correlators has never been demonstrated and would be quite costly.

SUMMARY OF THE INVENTION

The subject invention discloses devices and methods for sampling an analog signal and obtaining data analysis using a hybrid approach that combines the speed and dynamic range of FD with a sensitivity that rivals TCSPC, while being able to acquire all harmonics in a single parallel measurement. The devices and methods disclosed herein are suitable for data analysis of samples (for example, tissue samples, cell samples and one or more molecules) for a number of applications, including, but not limited to: FRET, fluorescence anisotropy, photon migration, fluorescence lifetime, nonlinear spectroscopy, CARS, time-resolved CARS, cellular imaging, tissue imaging, diagnostic applications, flow cytometry, image cytometry, gel readers, fluorescence correlation spectroscopy (FCS), time-resolved FCS, photon-counting histograms (PCH), fluorescence intensity distribution analysis (FIDA), ultrasound impedance measurements, plate readers, capillary electrophoresis, and imaging treatments.

In one embodiment, a sampling device for measuring an analog signal received from a detector is disclosed. The sampling device comprises a detector module for measuring a response generated from a sample. The detector module may include, for example, a photomultiplier tube, multianode photomultiplier tubes, a hybrid photomultiplier tube, hybrid photomultiplier tube arrays, photomultiplier tubes with multilevel discrimination, an avalanche photo diode, avalanche photo diode arrays, a photodiode, charge-coupled devices (CCDs), a complementary metal oxide semiconductor (CMOS), or any other suitable detector known in the art. In another embodiment, the detector comprises a parallel data channel which is adapted and configured to detect a plurality of analog signals. Accordingly, in this embodiment, each of the analog signals corresponds to a different portion of a spectral response of the sample. The sampling device also includes an ADC for sampling the analog signal, received from the detector module, and converting it into a digital signal. The ADC typically has a sampling rate of at least 1 MS/s. The ADC may be implemented with an ADC08D1500, for example, or other suitable analog-to-digital converter known in the art.

A logic circuit is coupled to the analog-to-digital converter for processing the digital signal provided, according to the subject invention. The logic circuit may be, for example, a field-programmable gate array (FPGA), an application specific integrated circuit, a discrete integrated circuit, or a dedicated integrated circuit. The digital signal processing includes, but is not limited to performing at least one of: a Fourier transform (FT) function, a Fast Fourier transform (FFT) function, a X function, a Y function, a Z function, a threshold function, or an averaging function. The logic circuit is also capable of performing further processing such that a sample is segmented into discrete components. In so doing, desired components of a sample, may be obtained, such as coefficients of the Fourier transform, multiple harmonic components of the analog signal, folding averages, etc. In addition, data analysis of the analog signal can be used to discriminate between a plurality of discrete events, such as distinguishing between photon events from the response relative to noise events from the detector.

In each of the sampling devices provided herein, the sampling rate of the converter is faster than the response of the sample. The logic circuit may also be capable of analyzing the digital signal acquired from the analog-to-digital converter, and the results obtained from the data analysis can be continuously transferred to a storage device, such as a personal computer (PC), or a hard disk. In one embodiment, the sampling device further includes a memory device coupled to the logic circuit for buffering the data analysis outputted by the logic circuit. An interface, such as a PCI, Firewire, PCI-e, e-sata, dedicated link to a storage device, or universal serial bus (USB), may also be coupled to the memory device for streaming the data analysis to an external display, memory or computational device, or a PC. A reference clock is coupled to the analog to digital converter for generating a sampling clock; and a data clock is coupled to the logic circuit for providing a reference clock pulse for processing of the digital signal.

In one specific exemplary embodiment, the sampling device of the present invention is used for data analysis of photon migration. The sampling device includes: a photomultiplier tube for detecting an analog signal of a response reflected from a tissue sample which has been excited by a laser or other source. The analog-to-digital converter samples the analog signal generated by the excited tissue sample, and is received directly from the photomultiplier tube, and converted into a digital signal. A logic circuit, for example, a programmable gate array, is provided and coupled to the ADC for processing the digital signal received from the ADC. Here, the sampling rate of the converter is faster than the time of flight or phase delay of the response, and the logic circuit is capable of analyzing the digital signal continuously acquired from the ADC such that data analysis is obtained. The processing may include any one of a Fourier transform function, a Fast Fourier transform function, an X function, a Y function or a Z function such that various components of the analysis may be obtained, stored and displayed.

The methods of the subject invention are analogous to the devices described herein. In one embodiment, a method for obtaining data analysis of an analog signal comprises the steps of providing a sample; subjecting the sample to a condition in order to generate a response; providing a detector module for detecting an analog signal of the response generated from the sample; sampling the analog signal received directly from the detector module, and converting it into a digital signal, wherein the sampling rate is faster than the response of the sample; providing a logic circuit for processing the digital signal provided; analyzing the digital signal continuously acquired from the analog to digital converter using the logic circuit; and performing data analysis on the digital signal. The method may further include the step of segmenting the digital signal into discrete components and continuously streaming the discrete components obtained to an external display device.

The subject invention has a number of advantages over known devices and methods. Previously, when sampling the harmonic content of the signal from the sample, there were three basic approaches: direct sampling, but with no streaming; heterodyning and homodyning. For heterodyne and homodyning, the detector (usually a PMT or CCD) had to be modulated at a frequency comparable to the illumination frequency of the light source used to investigate the sample. The resulting signal from the hetero/homodyning operation had a much lower frequency but required increased instrumentation and handling of the resultant data throughput. Thus, these hetero/homodyning introduce a range of drawbacks, among which are added cost, duty cycle losses in the detector (at least 50% loss in sensitivity), and the introduction of noise into the system by the RF modulation source. The subject invention overcomes these disadvantages by sampling the signal directly, analyzing the sampled data on the fly to reduce it to a manageable rate, and streaming the reduced data continuously to a recording device. Thus, it obtains desired data analysis in reduced form in a more cost effective and time efficient manner.

These and other aspects and advantages of the subject invention will become more readily apparent from the following description of the preferred embodiments taken in conjunction with the drawings.

BRIEF DESCRIPTION OF THE DRAWINGS

So that those skilled in the art to which the subject invention appertains will readily understand how to make and use the method and device of the subject invention without undue experimentation, preferred embodiments thereof will be described in detail herein below with reference to certain figures, wherein.

DETAILED DESCRIPTION OF THE INVENTION

Figure 1A:
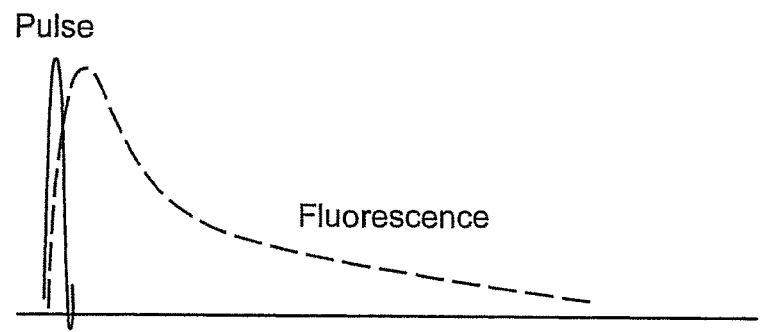
FIG. 1A illustrates the decay curve of fluorescence lifetime in TCSPC.
Figure 1B:
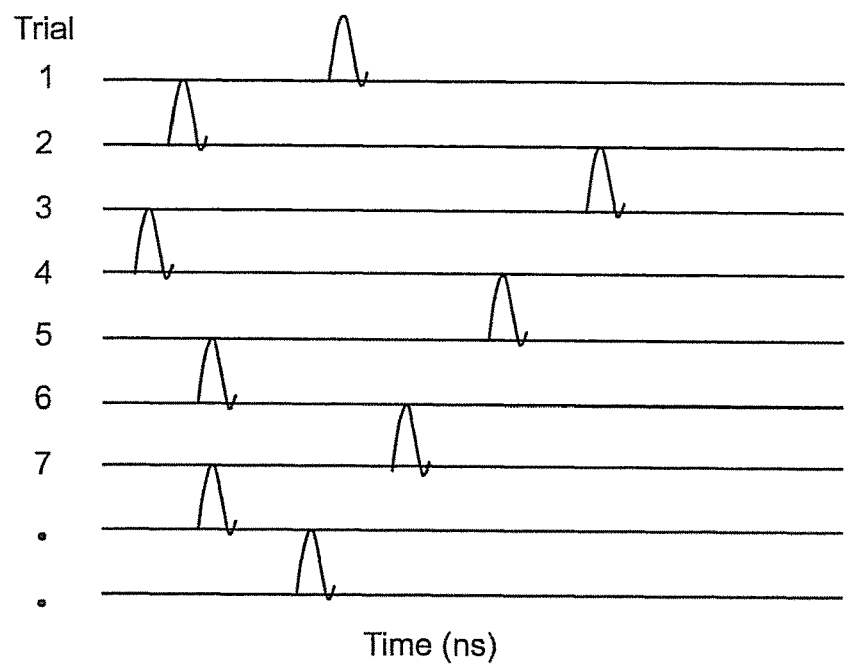
FIG. 1B illustrates the time of arrival of successive trials when a sample is excited with a pulsed source in TCSPC.
Figure 1C:
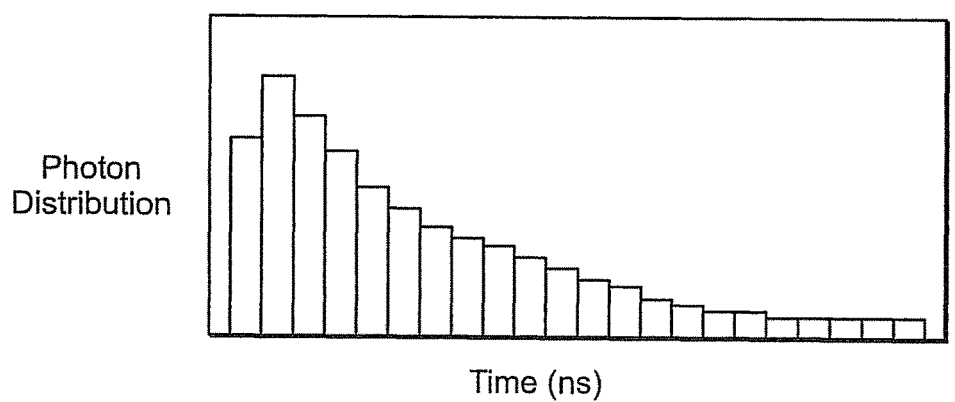
FIG. 1C illustrates a histogram of arrival times vs. the photon distribution constructed from successive trials in TCSPC.
Figure 2:
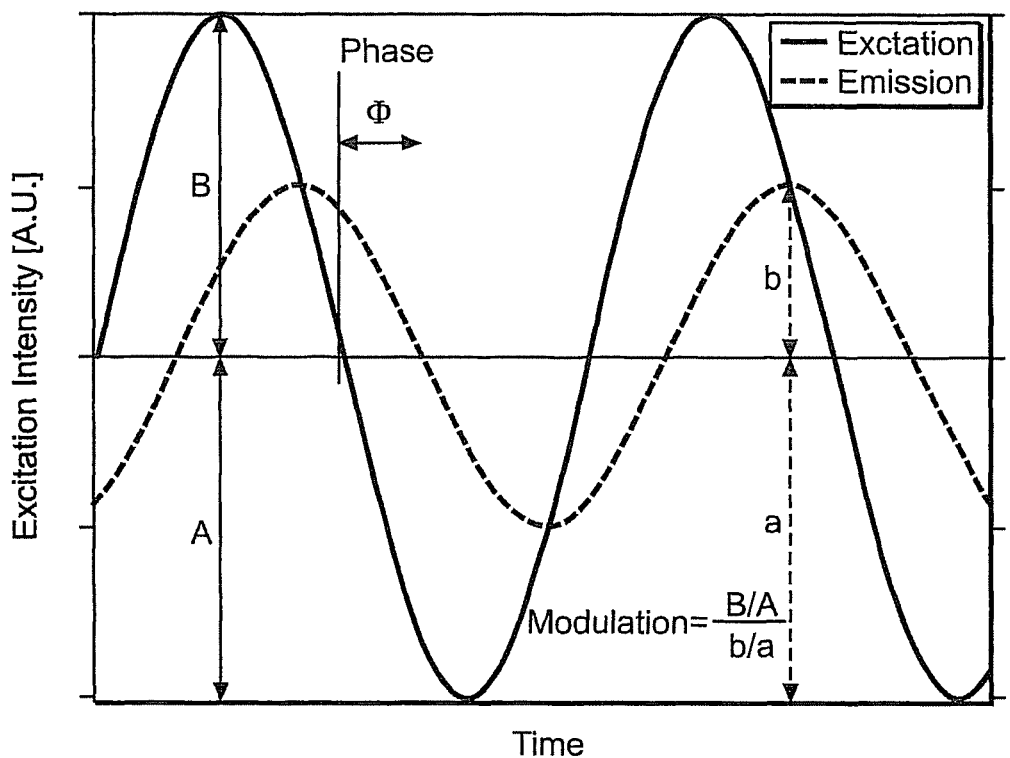
FIG. 2 illustrates the phase of an emission signal relative to the excitation signal in frequency domain lifetime spectroscopy.
Figure 3:
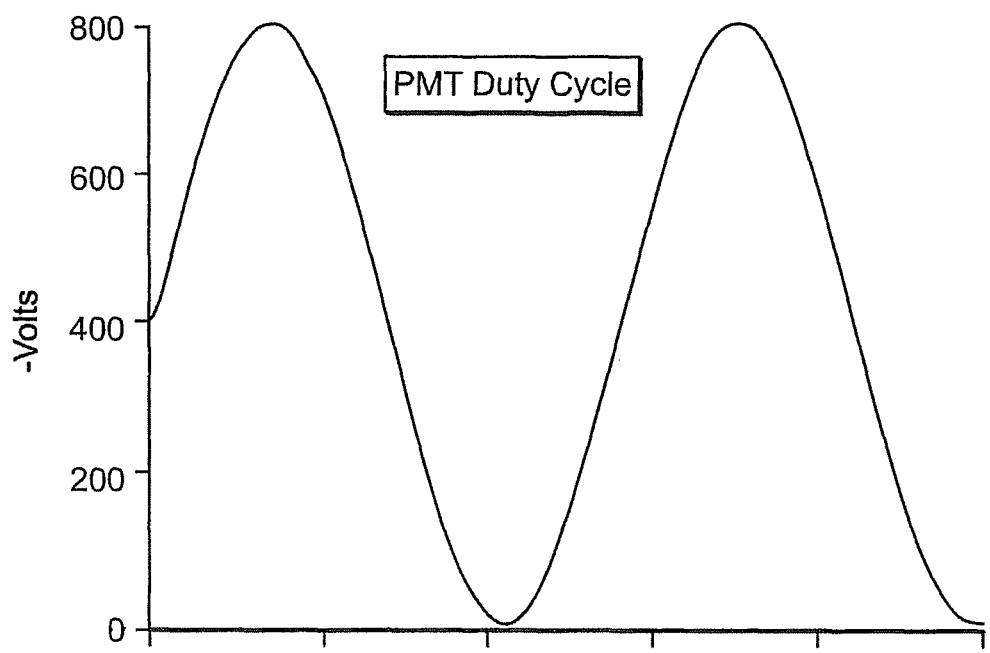
FIG. 3 illustrates the reduction in sensitivity of a duty cycle of a PMT detector.
Figure 4:
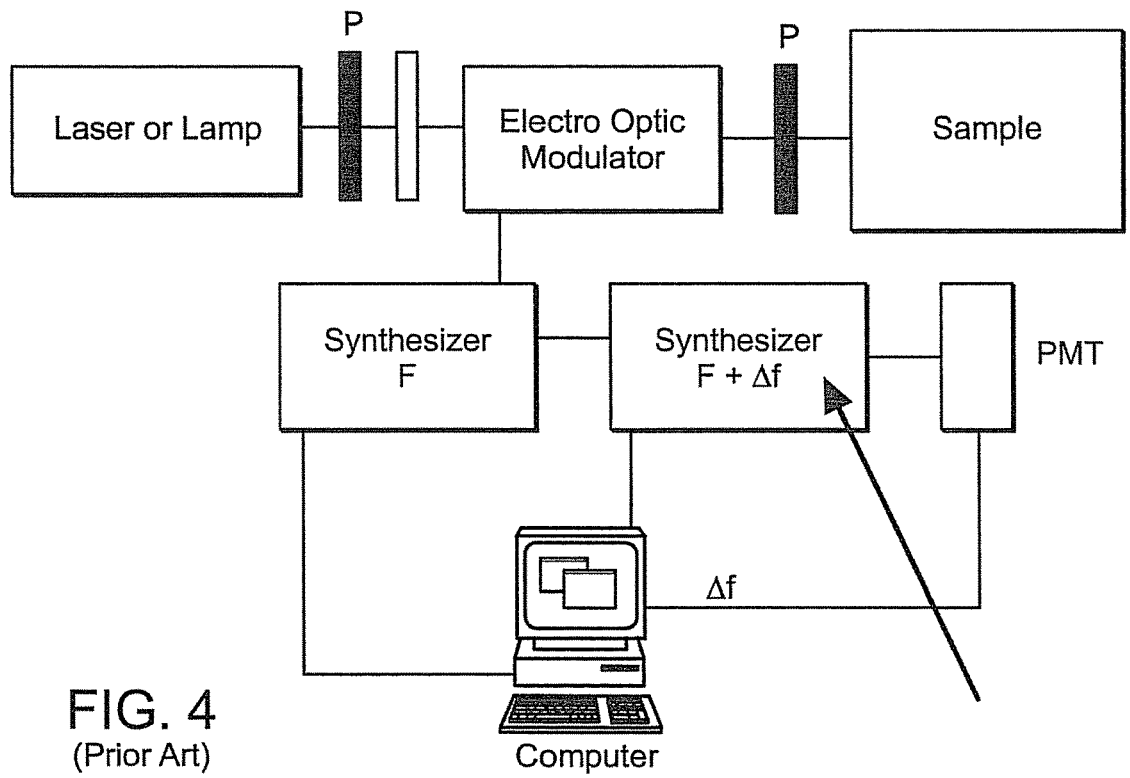
FIG. 4 is a schematic of a conventional frequency domain fluorometer.

Preferred embodiments of the present invention are described below with reference to the accompanying drawings, in which like reference numerals represent the same or similar elements.

The subject invention provides an improved method for time-resolved detection that combines the dynamic range of frequency domain (FD), the sensitivity of time-correlated single photon counting (TCSPC), while being able to simultaneous acquire all harmonics in parallel in a single measurement. The subject invention achieves several advantages and benefits including, but not limited to: sensitivity improvement of a factor of two to four over traditional frequency domain approaches, simultaneous acquisition of all harmonics; high speed acquisition faster than the both the frequency domain and TCSPC; the ability to handle high signal levels; and low cost and scalability.

According to the subject invention, in a fluorescence application, for example, a signal is sampled faster than the decay of the fluorescence. In the case of photon migration, a signal is sampled faster than the illumination modulation frequency. Thus, a time-resolved signal can be directly measured from a detector, without the analog mixing used in traditional FD measurements, such as heterodyning or homodyning. This dramatically increases the sensitivity, as the detector duty cycle remains at 100%. In addition, the devices and methods of the subject invention does not incur the sensitivity penalty from the noise added in the mixing process.

The direct measurement of the subject invention samples all harmonics simultaneously in a single measurement, unlike mixing, in which a single frequency is selected in a measurement. However, unlike TCSPC, the direct approach is not limited to less than one photon per laser period, giving the subject invention much greater throughput than either TCSPC or traditional PD. In addition, the sampling rate of the subject invention is faster than the response time of the detector, e.g. PMT. This enables the ability to sample individual photoelectron pulses from the PMT. Thus, the devices and methods of the subject invention allow for the discrimination between photon counts and darks counts as in TCSPC, which further increases low-light sensitivity over traditional H).

Figure 6:
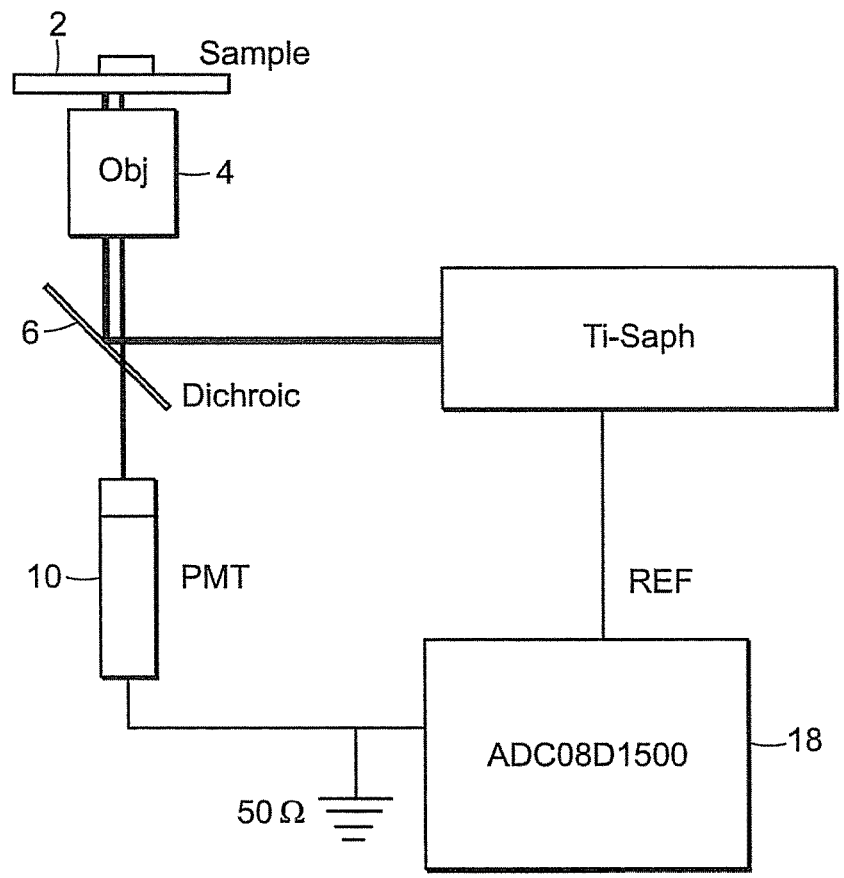
FIG. 6 illustrates one embodiment of the direct sampling frequency domain apparatus and method of the subject invention in which a ADC08D1500 converter is used.

FIG. 6 illustrates a prototyping kit from National Semiconductor which can be used, for example, in achieving the sensitive, rapid time-resolved acquisition of the subject invention. In FIG. 6, a sample 2 is excited by a source. The photon response from the sample 2 is reflected through the objective lens 4. A dichroic 6 or other filter is provided between the lens 4 and the detector 10, to selectively pass light of a certain colors (while reflecting other colors). The filtered analog signal is couple to the anode of a PMT 10, for example, an R7400 Hamamatsu PMT, which is connected to one of the analog inputs of the ADC 18 at the other end. In one embodiment, a ADC08D1500 converter is used as the ADC 18 shown in FIG. 6. The 50 ohm termination of the ADC 18 input converts the output current of the PMT 10 into a voltage for digitization.

The configuration of the subject invention illustrated in FIG. 6 has several advantages. First, the output of the PMT 10 is directly compatible with the analog input of the ADC 18 chip without any intervening electronics. Second, the device enables single photon sensitivity. Ordinarily, signals from PMT's are not continuous because they result from the superposition of pulses created from the amplified cascade of an individual photo or dark electron. However, even though the measurement of the subject invention is analog, photons can be discriminated from the dark current in the subject invention, because the fast sampling rate of the subject invention allows individual pulses to be distinguished.

In one exemplary embodiment, an R7400 series PMT 10 is used. Given the specifications of this detector, the magnitude and duration of a pulse due to a single photoelectron can be estimated. The PMT gain is therefore nominally specified as $10^6$, and the nominal output rise-time is 0.78 ns (corresponding to a pulse of about 1.6 ns). Since input capacitance of the digitizer is less than a picofarad, significant pulse broadening is not expected. So, a single photon would generate a pulse of $10^6$ photoelectrons over 1.6 ns, which, dividing charge over time, would general a peak current of 0.1 mA. This corresponds to a signal of 5 mV across the 50 ohm input impedance of the digitizer.

Figure 7:
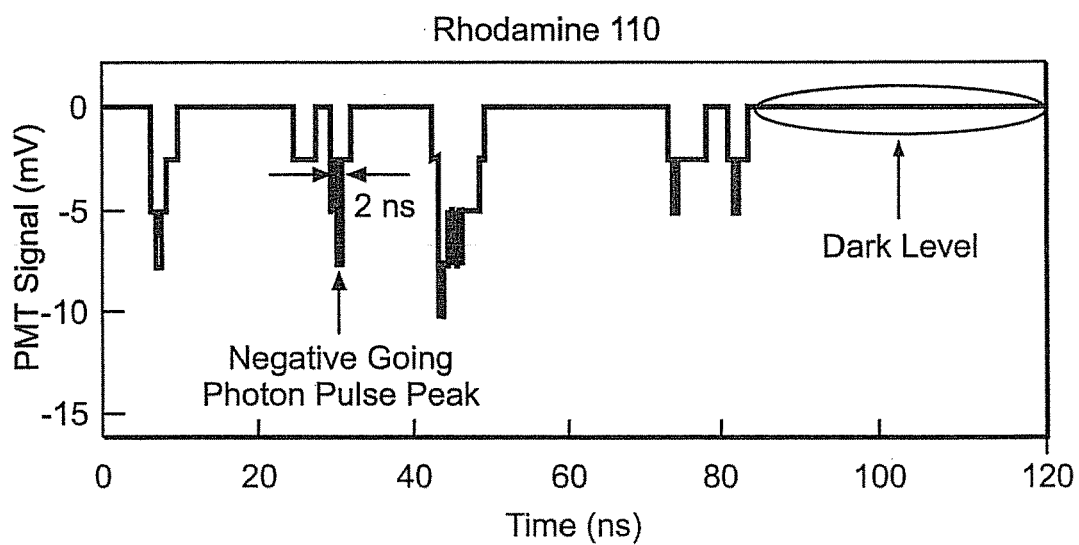
FIG. 7 illustrates a time trace according to the subject invention of the fluorescence of rhodamine 110 measured under low count rate conditions.

FIG. 7 illustrates a time trace outputted according to the subject invention where the fluorescence of rhodamine 110 was determined under low count rate conditions. With the ADC 18 configured with a sampling interval of 0.667 ns and voltage resolution of 2.5 mV, individual photon events are made distinguishable. In the absence of an event, the dark current does not the threshold of 2.5 mV, so the measured dark level is zero, as in photon counting.

Figure 8:
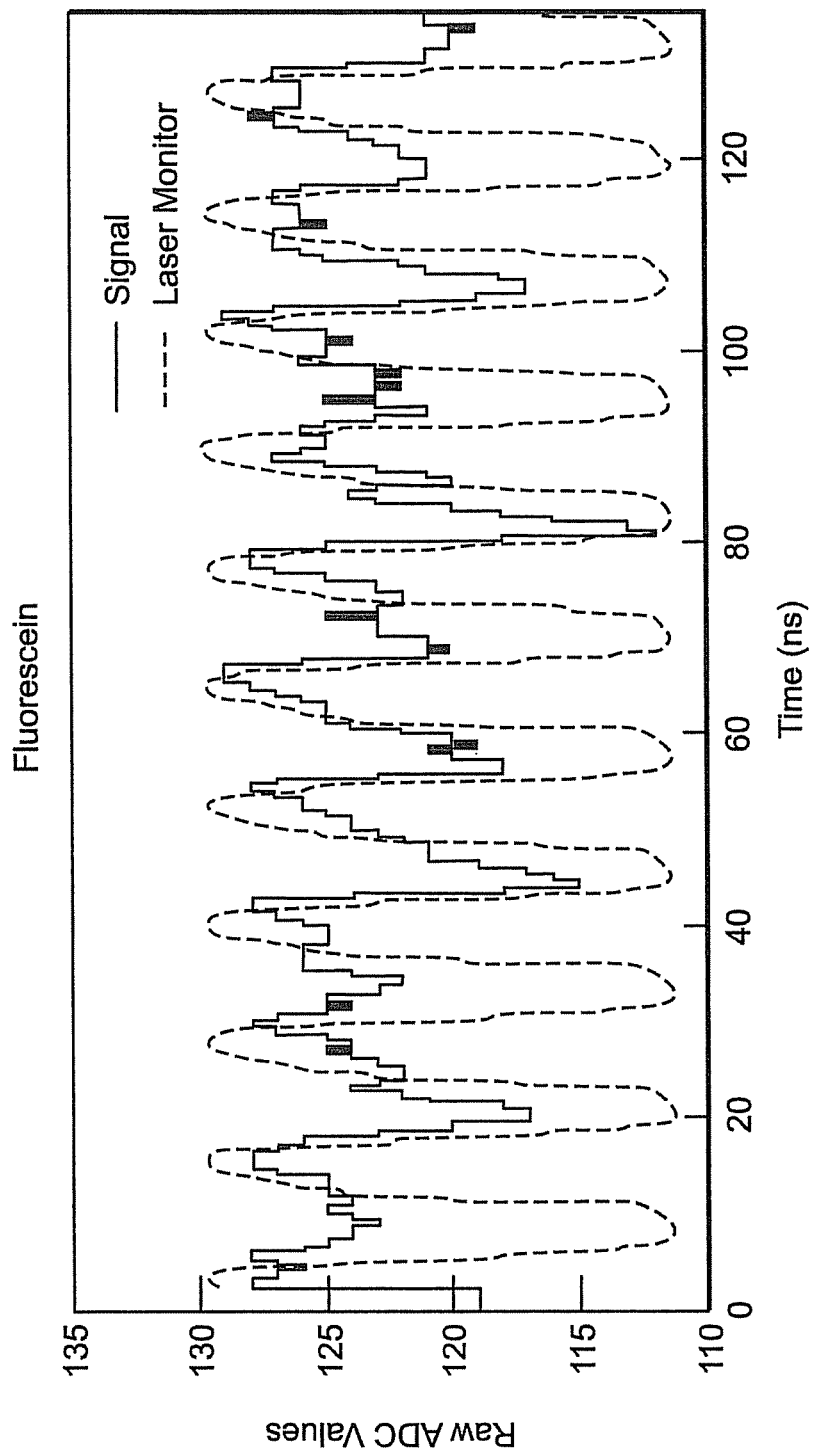
FIG. 8 illustrates a time trace according to the subject invention of the fluorescence of fluorescein under high emission intensity.

FIG. 8 shows data analysis according to the subject invention where the fluorescence of a fluorescein sample was measured under conditions of high emission intensity. In this case, many photons are detected per laser pulse and the individual photoelectron pulses are no longer isolated. Under these conditions, photon counting is no longer possible, but our analog detection continues to make valid measurements. In one instance, the fluorescence decay is obtained by averaging the recovering signal after each laser pulse shown in FIG. 8. The subject invention therefore allows analysis of the analog signal as a function of space (e.g. binning into spatial pixels in an image for instance) and time (as a time series which can be arbitrarily binned). Thus, decays can be successfully observed from both the high and low rate samples, under both extremes where individual photons were observed and where they were indistinguishable. From a single measurement, multiple harmonic components of the decay are simultaneously resolvable.

Figure 9:
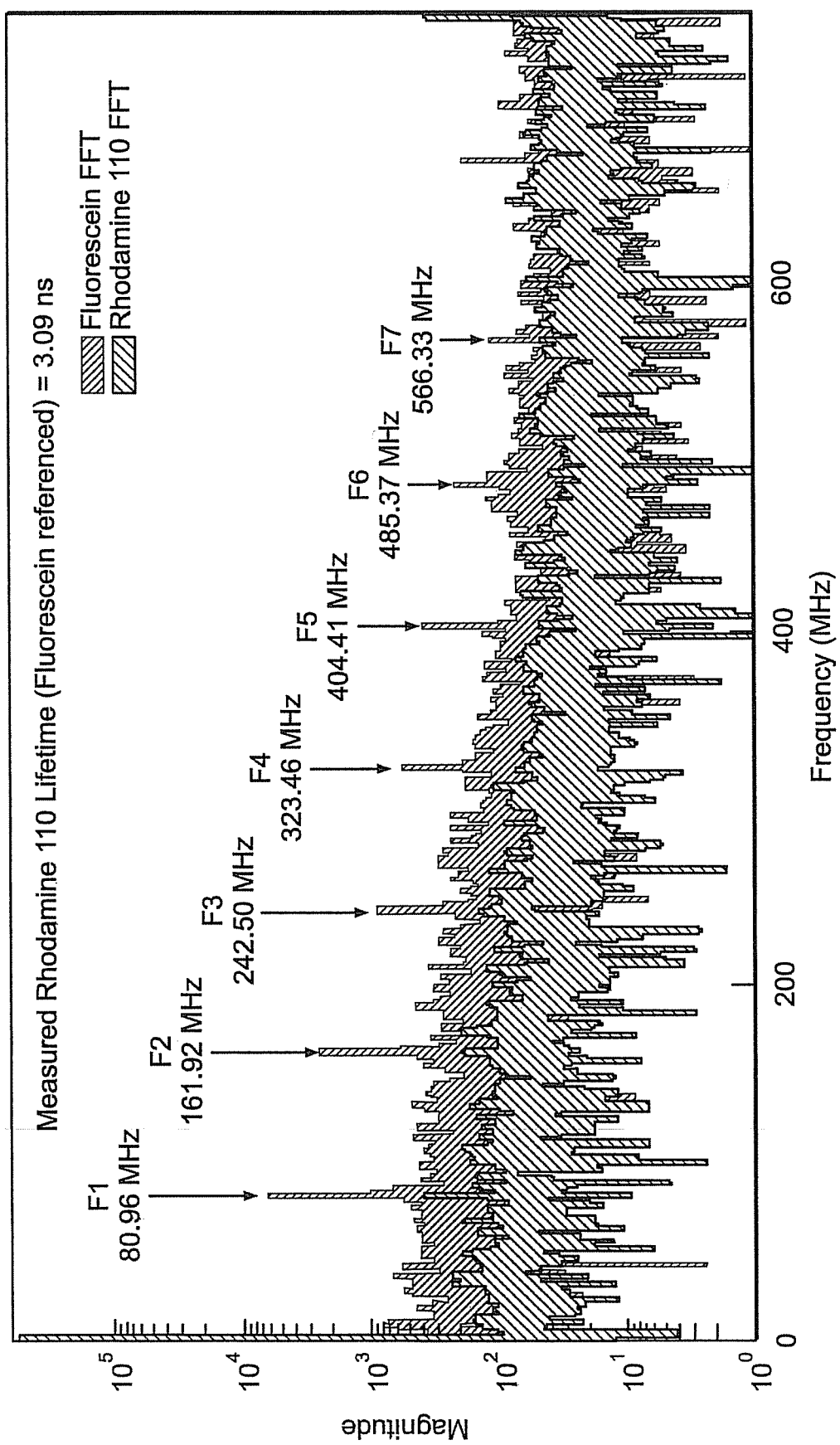
FIG. 9 illustrates the Fourier transform obtained of 2.7 microsecond time traces measured for the fluorescein and rhodamine 110 samples according to the subject invention.

FIG. 9 illustrates the FT of fluorescein and rhodamine 110 data. In each fluorescence sample, the data was collected in a 2.7 microsecond measurement, and time traces measured for both samples are shown. In both cases, distinct peaks are observed at multiple laser harmonics. From a 2.7 microsecond measurement, the lifetime was determined using standard FD analysis. Using fluorescein as a standard reference with 4 ns, the lifetime of the rhodamine 110 sample was found to be 3.09 ns as compared to the known value of 2.99 ns.

Dynamic Range

Dynamic range can be described as the range between the maximum and minimum signals detectable by the instrument. As noted above, conventional FD measurements excel at measuring high signals, but have lower sensitivities, while complementary TCSPC measurements have high sensitivity, but cannot measure high intensity samples. The devices and methods of the subject invention combine the best advantages of both traditional FD measurements and TCSPC techniques, as well as exceed the dynamic range of steady photon counting or analog measurements.

In one embodiment of the subject invention, an ADC08D1500 converter 18 is employed as the analog-to-digital converter. The high sampling speed of the ADC08D1500 converter 18 makes its eight bit resolution sufficient to capture signals from detectors. For low signal levels, as shown in FIG. 7, a 2.5 mV resolution is sufficient to measure single photon events. The maximum photon rate measurable by the ADC08D1500 converter 18 can be calculated from the peak level of the single photon response. In the exemplary configuration shown in FIG. 6, the maximum measurable negative voltage is −325 mV. Approximating the maximum peak level of the single photoelectron response as −10 mV corresponds to a maximum of 32 photons arriving simultaneously, where simultaneously means within the 1.6 ns minimum pulse time of the PMT 10. The maximum measurable detected photon flux is on the order of 32/1.6 ns or 20 GHz. Thus, the subject invention has the benefit of increasing significantly the typical linear range of a PMT detector.

In the devices and methods of the subject invention, the upper end of dynamic range may be detector limited. Accordingly, since the high sampling rate means an instantaneous measurement will not integrate many photons, the eight bit resolution of the ADC08D1500 12 is sufficient to capture single photon events through intensities which will saturate the detector 10. Thus, time-resolved measurements are made as rapidly as the detector linearity will allow.

Exemplary Application: High-Sensitivity, Direct Sampling Analog Acquisition Card for Rapid Parallel-Acquisition Frequency-Domain Spectroscopy As noted above, traditional FD measurements suffer from low sensitivity. However, lack of sensitivity is not an intrinsic feature of the frequency domain approach; rather it is a result of the instrumental methods which have been used to acquire FD data. In conventional devices, sensitivity is lost due to the need to reduce the modulation frequencies to match the slower sampling speeds of the digitization electronics. This reduction was performed by analog homodyning or heterodyning techniques, which both suffer from at least 50% signal loss from the duty cycle of the detector and lower sensitivity due to the noise introduced from the RF mixing. Because of the detector duty cycle problem, only one frequency can be mixed at a time, requiring a separate measurement of each modulation frequency, significantly increasing the acquisition time for multi-frequency measurements of conventional devices and methods. These disadvantages, however, are overcome by the subject invention.

Figure 10:
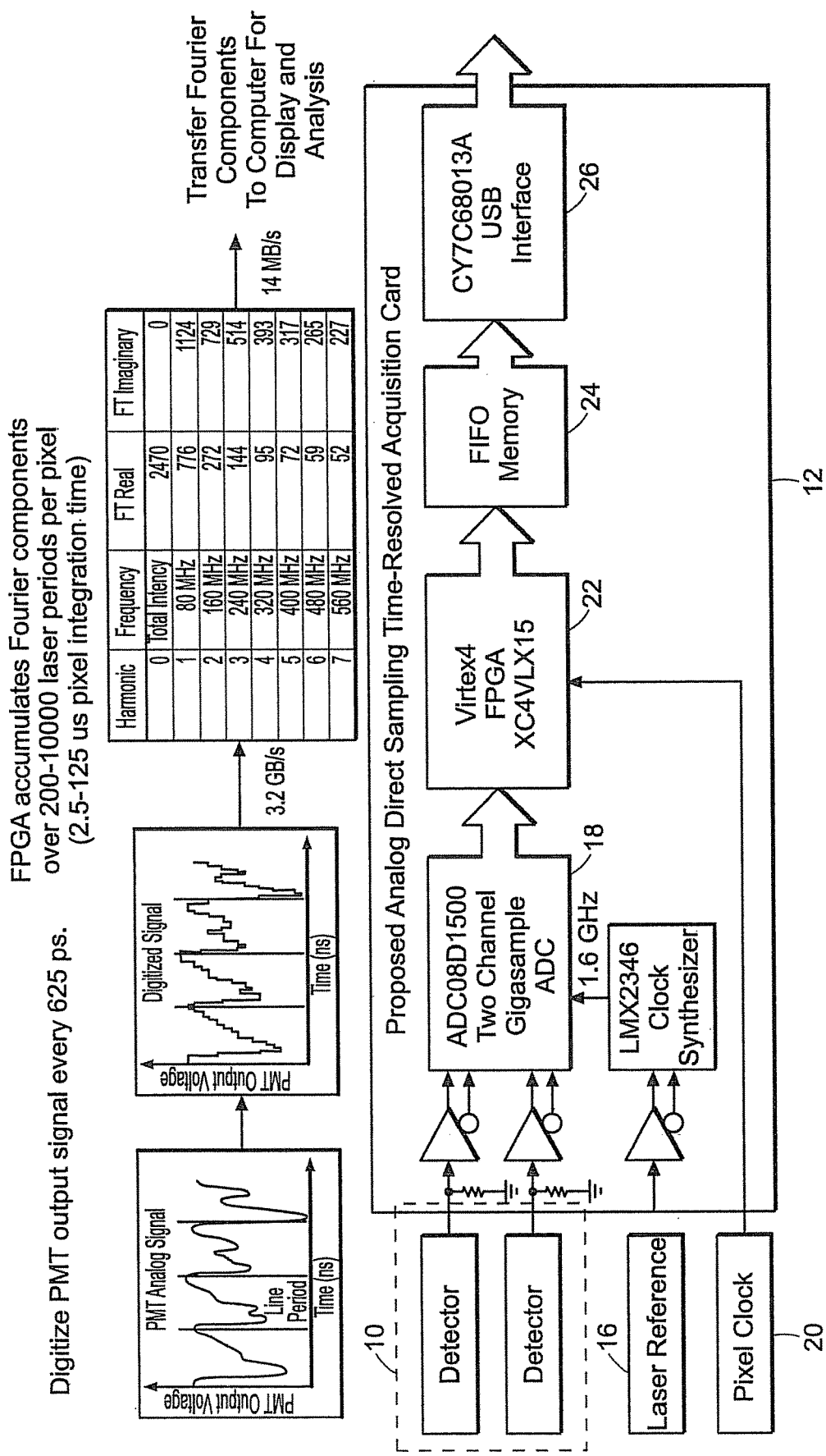
FIG. 10 shows one embodiment of a sampling device employed on a time-resolved acquisition card according to the subject invention.
Figure 11:
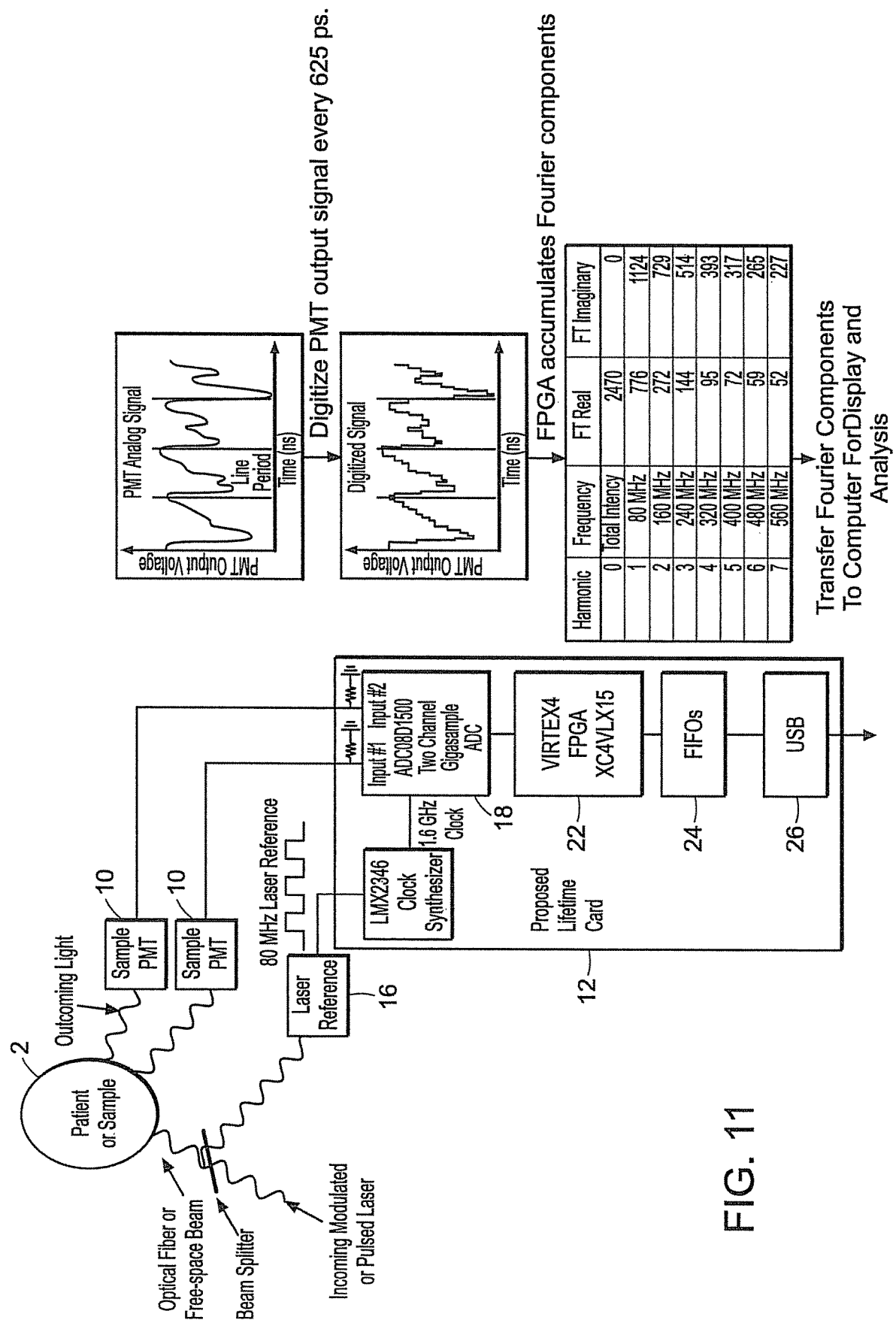
FIG. 11 illustrates a multichannel configuration of a sampling device employed using a time-resolved acquisition card within the context of photon migration application according to one embodiment of the subject invention.

Turning to FIGS. 10-11, the subject invention enables second channel analog-to-digital conversion for dual channel acquisition, employed using a time-resolved acquisition card 12. The time-resolved acquisition card 12 connected to detectors 10 includes the ADC 18, the logic circuit 22, and associated clocks (laser reference clock 16 and pixel clock 20), an optional first-in-first-out memory and an optional interface 26.

In one embodiment, a single analog-to-digital converter, for example, an ADC08D1500 converter 18 contains two independent analog-to-digital converters. Each of these converters are capable of making simultaneous measurements from two distinct inputs. The ADCs are independent in the sense that each input is separately measured in parallel (not multiplexed). However, the ADCs remain simultaneous because they both share the same sampling clock 16. Therefore to feed the converter 18, an analog front end for two 50 ohm terminated is created, analog single-ended inputs on the board for connection to two detector channels 10.

In one embodiment of the subject invention, it is possible to employ modulated excitation sources to excite a sample (for example, light emitting diodes (LEDs) or laser diodes), rather than pulsed light sources. This alternative increases the flexibility and portability of an application employing the devices and methods of the subject invention, thus reducing the costs of measurements produced.

In one embodiment, the device of the subject invention adds reference and scanning sync inputs to enable imaging (not shown). A laser reference 16 is created by using an external sampling clock, for example, the National Semiconductor LMX2346 single chip clock synthesizer to generate the ADC sampling clock from a pulsed or modulated laser reference signal. For an 80 MHz laser, a 1.6 GHz sampling clock will be synthesized to drive the ADC to synchronously sample the detectors 10 twenty times per laser period.

FPGA Implementation of FD Time-Resolved Measurements

As shown in FIGS. 10 and 11, the digitized signal will be transferred from the ADC08D1500 18 to a logic circuit 22, here, a Xilinx Virtex4 Field Programmable Gate Array (FPGA) on the card 12. Parallel data transfers will be made at full-speed through dedicated high-speed I/O lines on the card 12.

In this embodiment, the FPGA 22 is as critical component of the direct sampling method as the gigahertz digitizer itself. The bandwidth of the raw data from the two channels is 3.2 gigabytes/second, which is vastly greater than the capacity of even the fastest computer workstations and storage devices which typically operate with maximum sustained transfer rates of about 50 MB/s. Clearly for direct sampling method to prove practical, on-board data preprocessing is essential to reduce the data before it is transferred to a host computer. The FPGA 22 runs fast enough to process the raw data as it is being acquired, as well as controlling the ADC.

In our method, the information in a photon migration, fluorescence lifetime, or other time-resolved spectroscopy experiment, is contained in the Fourier transform coefficients of the raw data. However, only the coefficients at the laser harmonic frequencies contain information.

For 1.6 GHz sampling of an 80 MHz laser, the maximum number of harmonics measured is 10 by the Nyquist theorem. Although, depending on the signal-to-noise of an experiment, only the first several harmonics may contain information.

Since the information is contained in the harmonic coefficients, a dedicated algorithm in the FPGA 22 can be written to calculate the coefficients in real-time as the data is continuously acquired. The coefficients can be calculated on a per laser period basis, but only transfer the total for each coefficient at the end of a pixel integration period.

For example, for 5 microseconds of pixel integration using an 80 MHz pulsed laser, 400 laser pulses will occur and 8000 samples per channel will be acquired during the pixel. However, if desired, it is possible to retain only the coefficients from the total intensity and the first seven harmonics. Four bytes per harmonic, corresponding to 16 bits per coefficient can be used since both sine and cosine coefficients are present per harmonic. The zero harmonic is the total intensity, so the full 32 bits can be used for it. Overflows are avoided since the maximum total intensity per pixel is 8000*256 which fits in 21 bits. Similarly, overflows are avoided in the other coefficients, since there are only 400 total samples integrated per point in the laser period. In this case, 36 bytes per pixel per channel are sufficient. For two-channels, this corresponds to 14 MB/s which is about half the real, sustainable bandwidth of USB 2.0.

The hardware is flexible enough that choices of the pixel integration time and the number of harmonics to transfer can be changed on the fly during a desired experiment. Thus, data collection can be adjusted for the intensity and signal-to-noise of a particular application. This becomes more important when the acquisition is scaled to a large number of channels. Long integration times can be accumulated on the main computer from 5 microsecond integrations, since at that rate the main computer can efficiently accumulate the coefficients into 32, 64 bits, or more.

Xilinx freely provides an FFT core for the FPGA 22, so it would be possible to calculate a full FFT over the chunk of raw data acquired during the pixel integration time. However, in the instance where only the first several laser harmonics are desired and the laser period and pixel integration time of the measurement are known in advance, it is possible to optimize the computation by calculating the coefficients as sine and cosine weighted moments at only the harmonics of interest. This approach has already been used for video rate FLIM. The FPGA 22 can perform this calculation as a multiply and accumulate operation from preloaded sine and cosine tables. The tables needs only as many entries as there are samples per laser period, which are usually 20. Both the tables and the results can be processed in circular buffers, with a pointer incremented by the sample clock 16. Each coefficient from a laser period is summed the corresponding coefficient from the previous laser periods and only the total is transferred at the end of the end of the pixel integration. Performing the integration over the laser period instead of the pixel integration time also minimizes the effect of artifacts such as instrument drift photobleaching in the sample.

Figure 12:
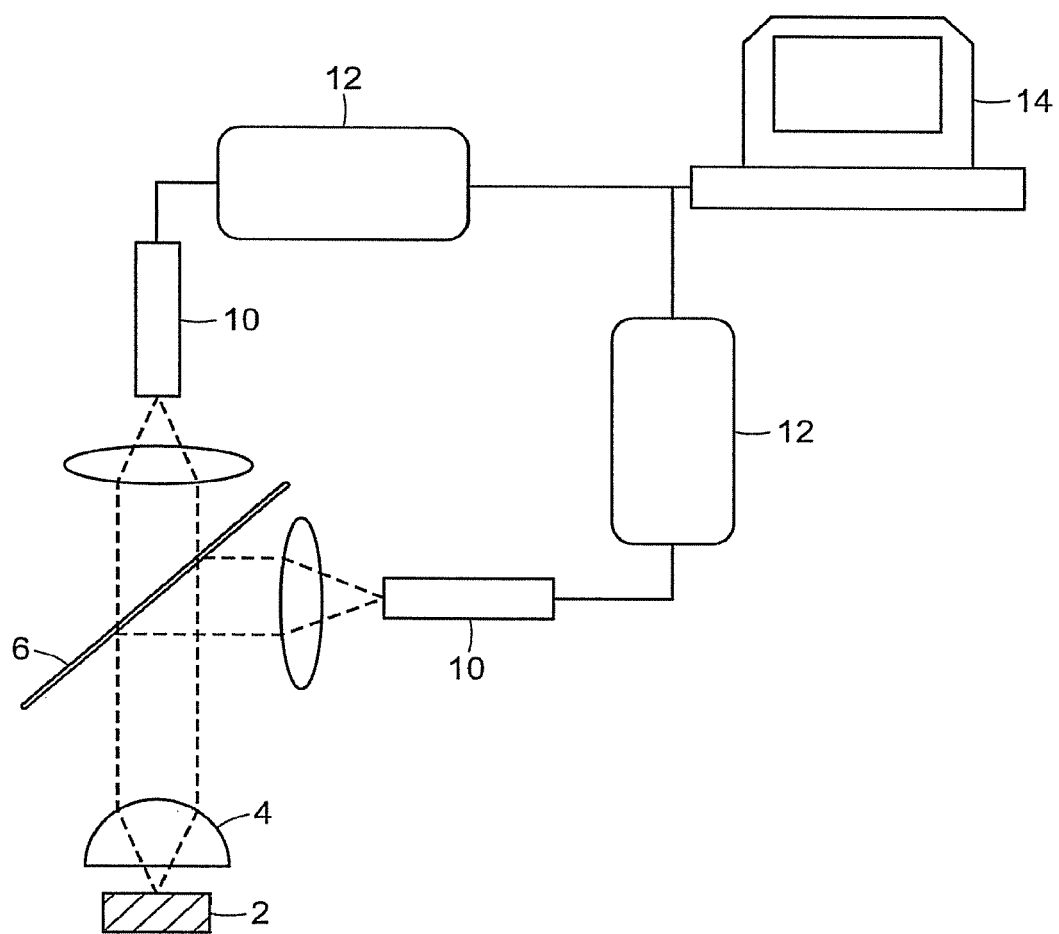
FIG. 12 illustrates the configuration of two time-resolved acquisition cards shown in FIG. 10 according to the subject invention.

FIG. 12 illustrates how two time-resolved acquisition cards 12, shown in FIG. 10, can be configured according to one embodiment of the subject invention. The cards 12 are connected to an end computer 14, which may be used for further analysis, storage and display. Additional channels can be implemented through the use of additional acquisition cards, detectors, filters, gratings, or prisms.

USB Transfer Module and FIFO Memory

The FPGA 22 gives the card 12 the ability to continuously acquire time-resolved and stream it directly to the host computer for real-time display. This is essential for applications, such as video-rate imaging, which require the rapid acquisition of data and is not possible with RF signal analyzers. This is also important when the number of channels is scaled up. To accommodate this capability, a small amount of fast First In First Out (FIFO) memory 24 can be added to augment the transfer FIFOs in the CY768013A USB controller 26. This memory is not used to store the measurements, but is used for streaming to buffer the data so it is not lost if the host computer delays a transfer from the card 12. This will ensure robust performance during continuous acquisition. In another embodiment, a universal serial bus, for example, a Labview® USB driver, can be used for data transfer and display. The USB driver 26 captures the data sent to the external storage device, for example, a PC, through an interface (for example, USB port), from the sampling device in order to enable display and streaming of the data to a disk.

Representative Applications

There are several products and areas where this invention will be of benefit. The following are a few examples.

Photon Migration. Photon migration can analyze the composition of a tissue based on the scattering and absorption coefficients of scattered near infrared light. The tissue is illuminated with light that is modulated at frequency in the range of 10 MHz to 1 GHz and the modulation and phase shift of the scattered light is measured. Information about the tissue composition and physiology can be then calculated by employing diffusion theory models. Photon migration offers promising therapeutic strategies for neonatal care, stroke diagnosis, tissue oxygenation, breast cancer identification, and sleep apnea diagnosis. There is a strong move towards instrumentation with tens to hundreds of channels. TCSPC is too expensive to scale with multiple channels. However, the method of the subject invention allows multiple harmonics to be captured simultaneously and with higher sensitivity than standard FD.

FLI Microscopy. Current fluorescent lifetime imaging microscopy instrumentation suffers from a number of limitations with the dynamic range and speed. When combined with multifoci imaging, fluorescent lifetime imaging microscopy systems have the potential to offer real time in vivo lifetime imaging. Current lifetime imaging systems based on TCSPC are limited to image acquisition rates on the order of minutes to tens of minutes, far too slow for most biological applications. The fast lifetime acquisition capabilities of the present invention, however allow much higher image frame rates without saturation problems with the electronics.

FRET. The Zeiss LSM510 has proven to be an enormously popular product, enabling biologists to conduct FRET studies far more easily than previously. The addition of spectral resolved lifetime microscopy will greatly aid FRET studies in cell culture, and more importantly, tissue based FRET studies where FRET based on purely spectral approaches suffer from uneven absorption and scattering of different wavelengths. Additionally, lifetime provides an additional contrast modality, further increasing the number of components that can be visualized in image, and aiding spectral unmixing of multi-wavelength images.

Figure 5:
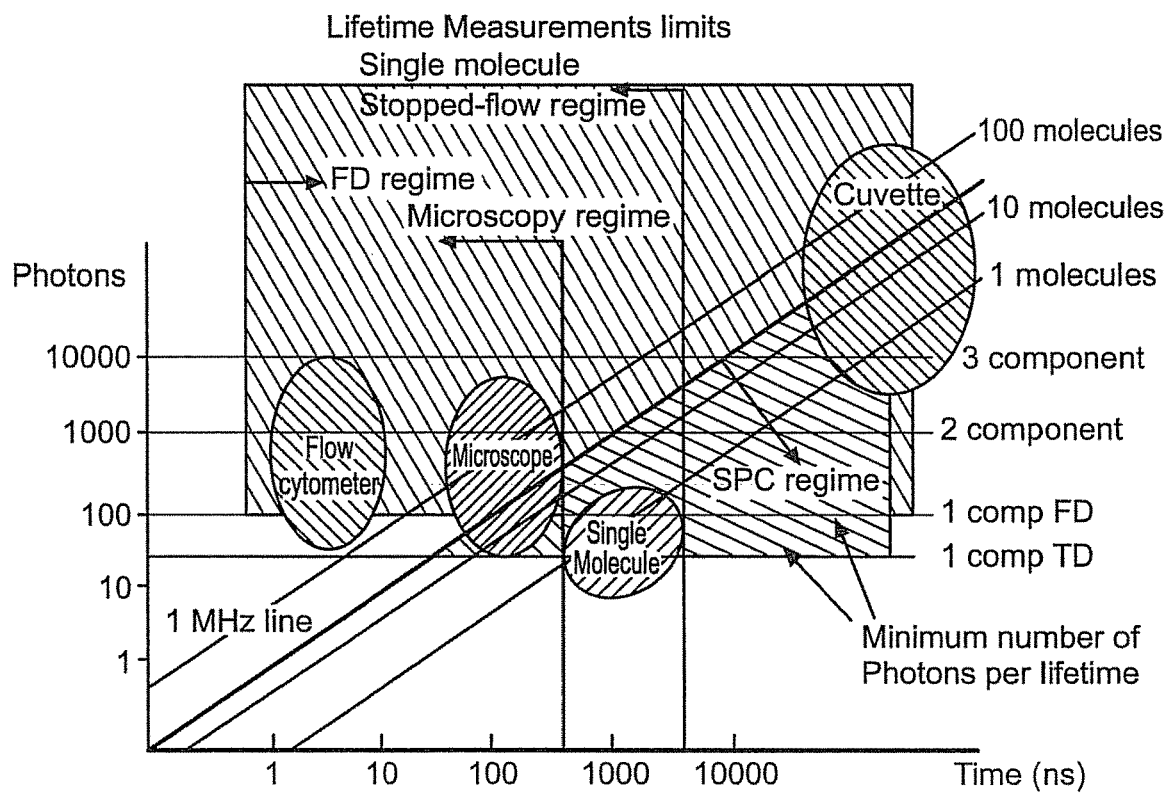
FIG. 5 is a chart showing examples of application areas that benefit from the frequency domain versus the time domain approach to time-resolved measurements.

Cytometric Studies. Both Flow and image cytometry require small integration and the ability to handle high photon fluxes. TCSCP is uncompetitive in this area as shown in FIG. 5, and the DSAL card will have a significant competitive advantage. Furthermore, FD lacks the sensitivity for dimmer, but biologically important, aspects of the cellular physiology.

Multi Wavelength Frequency encoded Excitation and Detection. Multiple excitation wavelengths modulated at different frequencies can be employed to further increase the discrimination of multiple components.

Pharmaceutical Assays. The high throughput rate of DSAL lends itself well to the industrial pharmaceutical setting for high throughput assays based on lifetime analysis of compounds, cells and tissues. Again, TCSPC is not well suited for this regime, and the DSAL data acquisition approach has the opportunity to capture a significant portion of the market for lifetime assays.

Although the subject invention has been described with respect to preferred embodiments, those skilled in the art will readily appreciated that changes or modifications thereto may be made without departing from the spirit or scope of the subject invention as defined by the appended claims.

What is claimed is:

1. A device for performing a time-resolved measurement of a biological sample using an analog signal from a detector comprising:
    a light source that illuminates a biological sample with illuminating light through a lens at an illumination frequency in a range of 10 MHz to 1 GHz;
    a light source reference clock that generates a light reference signal and a sampling clock that generates a sampling signal having a sampling rate;
    a light detector that detects a spectral component of fluorescence lifetime signals from the biological sample in response to the illuminating light, the fluorescence lifetime signals being collected through the lens for each of a plurality of decay time periods of the biological sample in response to the illuminating light that illuminates the biological sample at the illumination frequency, the light detector generating analog signals;
    an analog to digital converter that samples the analog signals received from the light detector that converts the received analog signals into digital data signals, and wherein the analog to digital converter operates at the sampling rate which is faster than the illumination frequency;
    a logic circuit coupled to the analog to digital converter, the logic circuit being operative to process the digital data signals to generate and transfer a plurality of the digital data signals during each of the plurality of decay time periods; and
    a data processing system that receives the digital data signals from the logic circuit such that the data processing system processes the digital data signals to generate data characterizing a fluorescence decay of the biological sample.

2. The device of claim 1, further comprising a memory device coupled to the logic circuit that buffers a data transfer to the processing system.

3. The device of claim 2, further comprising an interface coupled to the memory device that streams the digital data signals to an external display device.

4. The device of claim 1, wherein the sampling clock operates at a gigahertz rate.

5. The device of claim 1, wherein the light source reference is connected to the sampling clock that comprises a synthesizer.

6. The device of claim 1, further comprising a pixel clock coupled to the logic circuit that provides a clock pulse to process the digital signals.

7. The device of claim 1, wherein the biological sample is selected from the group consisting of a tissue sample, a cell sample, and one or more biological molecules.

8. The device of claim 1, wherein the second detector further comprises one or more detector elements selected from the group consisting of a photomultiplier tube, a multianode photomultiplier tube device, a hybrid photomultiplier tube, hybrid photomultiplier tube arrays, a photomultiplier tube with multilevel discrimination, an avalanche photodiode, avalanche photo diode arrays, a photodiode, a CCD (charge coupled device), and a CMOS (complementary metal oxide semiconductor) device.

9. The device of claim 1, wherein the analog to digital converter has a sampling rate of at least 1 MS/s.

10. The device of claim 1, wherein the logic circuit is selected from the group consisting of a field-programmable gate array, an application specific integrated circuit, a discrete integrated circuit, and a dedicated integrated circuit.

11. The device of claim 1, wherein the data processor processes the digital data signals includes performing at least one of a Fourier transform function, a Fast Fourier transform function, a X function, a Y function, a Z function, a threshold function, or an averaging function.

12. The device of claim 1, wherein the logic circuit performs further processing such that components of the digital data signals are obtained.

13. The device of claim 12, wherein the components include coefficients of a Fourier transform, multiple harmonic components of the analog signal, or a folding average.

14. The device of claim 1, wherein the digital data signals are used for at least one of cellular imaging, tissue imaging, diagnostic applications, flow cytometry, image cytometry, FCS (fluorescence correlation spectroscopy), or time-resolved FCS.

15. The device of claim 1, wherein the light detector comprises a plurality of detector elements having parallel data channels that detect a plurality of analog signals.

16. The device of claim 15, wherein each analog signal of the plurality of analog signals corresponds to a different portion of a spectral response of the sample.

17. The device of claim 1, wherein data analysis of the analog signals is used to discriminate between a plurality of photon events from the response or noise events from the light detector.

18. The device of claim 1, wherein the logic circuit processes the digital data signals to segment the time varying response into discrete components.

19. The device of claim 1, wherein the processing comprises generating a plurality of coefficients, and wherein the logic circuit selects at least one coefficient of the plurality of coefficients to generate the digital data signal.

20. The device of claim 1 wherein the light detector detects a plurality of harmonics of the illuminating light and generates a corresponding plurality of analog signals.

21. A method for performing data analysis of an analog signal to perform a time-resolved measurement of a biological sample comprising:
illuminating a biological sample with light to generate a time decaying fluorescent response from the biological sample, the light emitted by a light source at an illumination frequency in a range of 10 MHz to 1 GHz;
generating a light reference signal using a light source reference;
generating a sampling signal having a sampling rate using a sampling clock;
detecting, using a light detector analog signals corresponding to the time decaying fluorescent response to the illuminating light generated from the biological sample for each of a plurality of decay time periods of the biological sample in response to the illuminating light that illuminates the biological sample at the illumination frequency;
sampling the analog signals using an analog to digital converter that receives the analog signals from the light detector and converts the analog signals to digital data signals, wherein the analog to digital converter operates faster than the illumination frequency;
processing, using a logic circuit, the digital data signals to generate a plurality of digital data signals; and transferring the plurality of digital data signals from the logic circuit to a processing system during each of the plurality of decay time periods.

22. The method of claim 21, further comprising segmenting the digital data signals into discrete components.

23. The method of claim 22, further comprising continuously streaming the discrete components to an external display device.

24. The method of claim 21, further comprising forming a frequency domain representation having a plurality of coefficients, and wherein the processing of the digital data signals includes selecting at least one coefficient of the plurality of coefficients to generate the digital data signal.

25. The method of claim 21, wherein data analysis of the analog signals is used to discriminate between a plurality of photon events from the response or noise events from the second detector.

26. The method of claim 21, wherein the processing of the digital data signals includes performing at least one of a Fourier transform function, a Fast Fourier transform function, a X function, a Y function, a Z function, a threshold function, or an averaging function.

27. The method of claim 21, further comprising generating a sampling clock pulse using a reference clock, the reference clock being connected to the analog to digital converter.

28. The method of claim 21, further comprising generating a synthesized sampling signal with the sampling clock.

29. The method of claim 21 further comprising determining a plurality of Fourier coefficients, each Fourier coefficient corresponding to a different harmonic of the illuminating light.

30. The method of claim 21 further comprising imaging the biological sample.

31. The method of claim 21 further comprising binning detected signals.

32. A method for performing data analysis of an analog signal to perform a time-resolved measurement of a biological sample comprising:
illuminating a biological sample with light at a frequency associated with a light reference signal to generate a time decaying fluorescent response from the biological sample during each of a plurality of illumination periods, the frequency being in a range of 10 MHz to 1 GHz;
detecting, using a photomultiplier tube detector, analog signals corresponding to the time decaying fluorescent response to the illuminating light generated from the biological sample for each decay time period of the biological sample during each of the plurality of illumination periods;
sampling at a sampling rate of at least 1 MS/s using an analog to digital converter that receives the analog signals from the photomultiplier tube detector, and converting the analog signals to digital signals, the sampling rate of the analog to digital converter being clocked by a sampling clock signal at a rate faster than the frequency associated with the light reference signal; and
processing, using a logic circuit, the digital signals to generate a digital data signal that is continuously transferred from the logic circuit to a processing system.

33. The method of claim 32 wherein the sampling by the analog to digital converter is at a gigahertz rate.

34. The method of claim 32 further comprising detecting a plurality of image frames during each decay period and processing image data to reduce the digital data signals with the logic circuit.

35. The method of claim 32 further comprising streaming image data from the logic circuit to the data processor with a first-in, first-out memory and a bus driver connected to a serial bus.

* * * * *